United States Patent [19]

Nakamura

[11] Patent Number: 4,553,237
[45] Date of Patent: Nov. 12, 1985

[54] ERROR-CORRECTION SYSTEM FOR TWO-DIMENSIONAL MULTILEVEL SIGNALS

[75] Inventor: Katsuhiro Nakamura, Tokyo, Japan

[73] Assignee: NEC Corporation, Tokyo, Japan

[21] Appl. No.: 532,935

[22] Filed: Sep. 16, 1983

[30] Foreign Application Priority Data

Sep. 17, 1982 [JP] Japan .................. 57-161876

[51] Int. Cl.$^4$ .................. G06F 11/10; H04L 5/12
[52] U.S. Cl. ...................... 371/37; 371/43; 375/27
[58] Field of Search .............. 371/43, 44, 45, 37; 375/27, 38, 39

[56] References Cited

U.S. PATENT DOCUMENTS

| | | | |
|---|---|---|---|
| 3,891,959 | 6/1975 | Tsuji et al. | 371/43 |
| 4,211,996 | 7/1980 | Nakamura | 371/37 |
| 4,346,472 | 8/1982 | Ohkoshi et al. | 371/37 |
| 4,483,012 | 11/1984 | Wei | 375/27 |

OTHER PUBLICATIONS

G. D. Forney, Jr. et al., A High-Speed Sequential Decoder: Prototype Design and Test, IEEE Trans. on Comm. Technology, vol. COM-19, No. 5, Oct. 1971, pp. 821-835.

*Primary Examiner*—Charles E. Atkinson
*Attorney, Agent, or Firm*—Sughrue, Mion, Zinn, Macpeak and Seas

[57] ABSTRACT

Disclosed is an error correction system in which part of the data bits of first multilevel input data is differentially encoded to form second data comprising the differentially encoded data bits and the remainder data bits and converting the bit patterns of the second data into third data in two-dimensional multilevel signal space according to a predetermined transfer function. A transparent error-correcting code is derived from each of the different phases of the third data and appended to each different phase to thereby form fourth data which is then modulated upon a carrier in two-dimensional multilevel signal space for transmission to a receiver where the signal is demodulated to recover the fourth data. The appended error-correcting code is separated from each different phase of the fourth data. An error which might exist in the received data is corrected by the separated error-correcting code in respect of each phase. The bit pattern of the error-corrected data is reconverted to recover the original second data. One of the phases of the second data is differentially decoded to recover the original first data.

9 Claims, 6 Drawing Figures

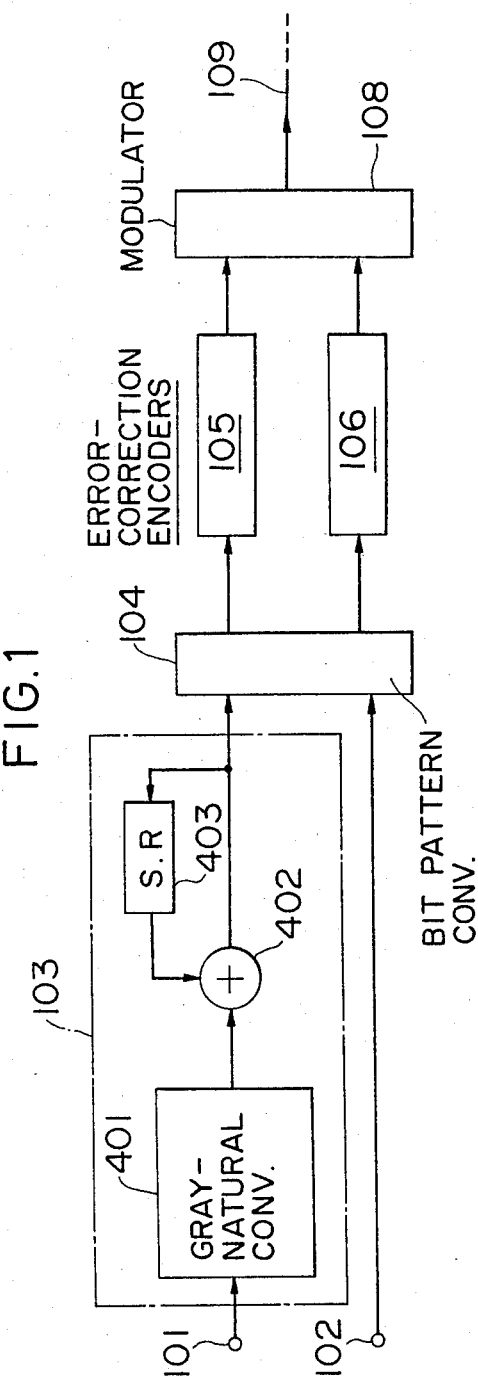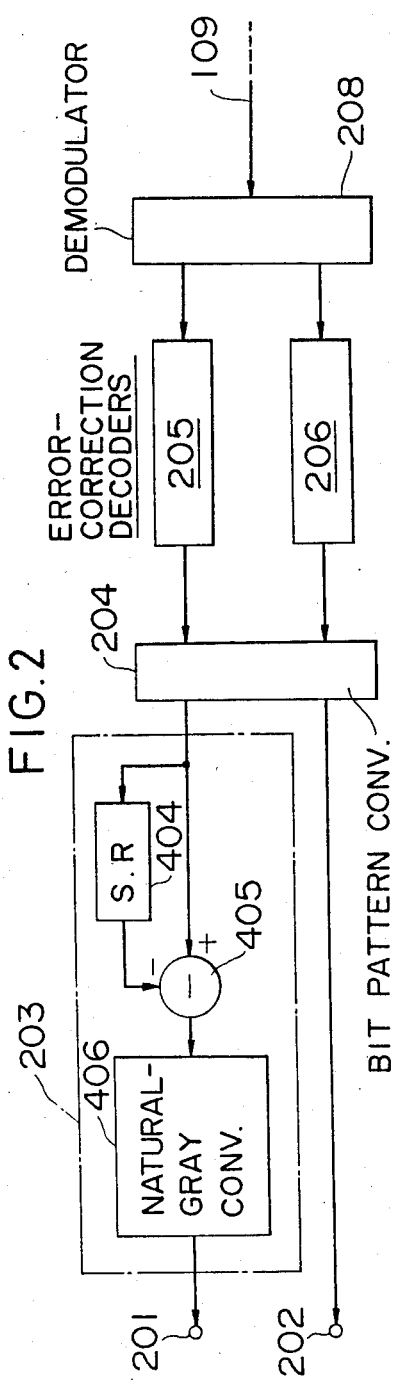

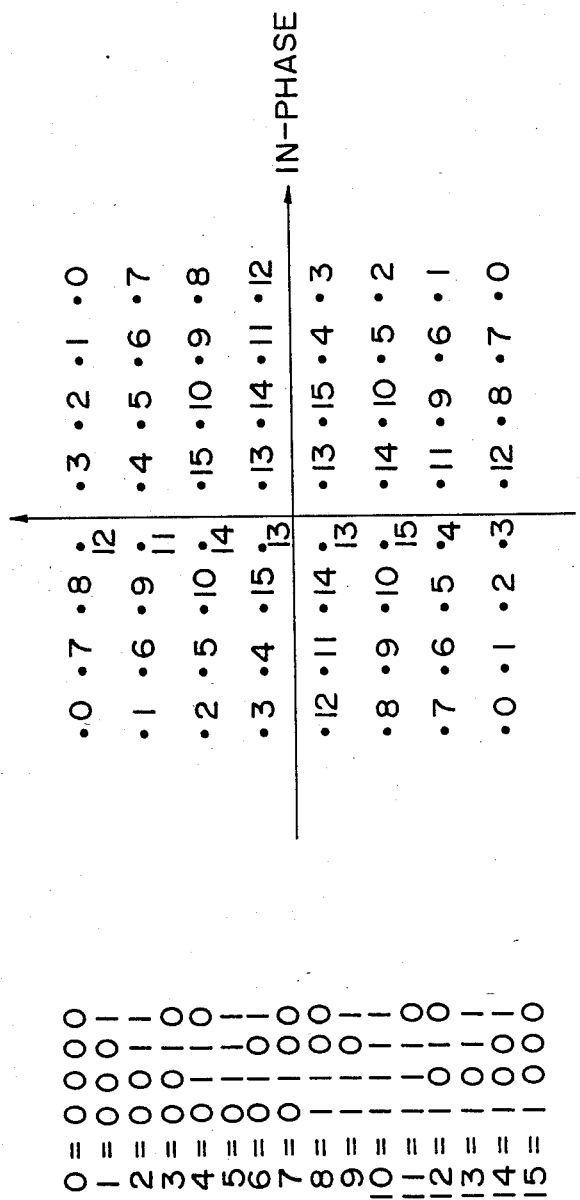

FIG.4

```
      QUADRATURE                         IN-PHASE 43  33   23   13   03 | 07   17   27   37
   •   •    •    •    • |  •    •    •    •
  42  32   22   12   02 | 06   16   26   36
   •   •    •    •    • |  •    •    •    •
  41  31   21   11   01 | 05   15   25   35
   •   •    •    •    • |  •    •    •    •
  40  30   20   10   00 | 04   14   24   34
   •   •    •    •    • |  •    •    •    •
  ─────────────────────── ─────────────────── →
  47  57   67   77      | 47   57   67   77
   •   •    •    •      |  •    •    •    •
  46  56   66   76      | 46   56   66   76
   •   •    •    •      |  •    •    •    •
  45  55   65   75      | 45   55   65   75
   •   •    •    •      |  •    •    •    •
  44  54   64   74      | 44   54   64   74
   •   •    •    •      |  •    •    •    •
```

0 = 000
1 = 001
2 = 010
3 = 011
4 = 100
5 = 101
6 = 110
7 = 111

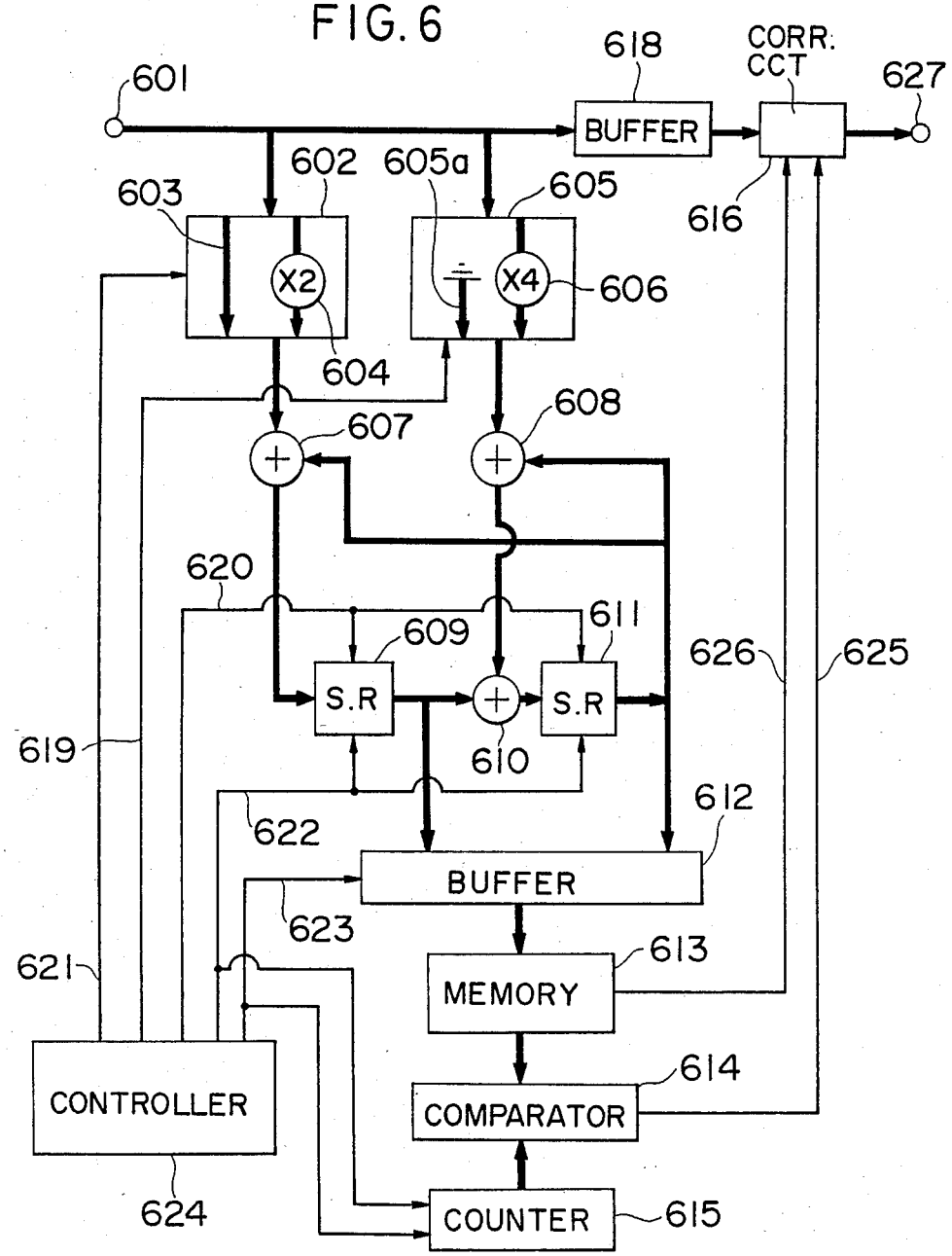

ERROR-CORRECTION SYSTEM FOR TWO-DIMENSIONAL MULTILEVEL SIGNALS

BACKGROUND OF THE INVENTION

The present invention relates to the error correction coding and decoding of two-dimensional multilevel signals.

In digital transmission, one approach to decreasing transmission errors involves error correction coding. There have not been such error signal correction coding schemes suitable for two-dimensional multilevel signals for which differential coding is commonly used so that the modulated data stream is immune to carrier phase ambiguities. For the modulated signal (for example, multilevel quadrature amplitude modulation signal), there are some problems to be settled from the aspect of the error correction coding.

One problem resides in the fact that, due to the differential coding an error introduced to a given symbol during transmission would affect another symbol, thereby multiplying itself prior to reception.

Another problem resides in the fact that due to the two-dimensional multilevel signal space it becomes inefficient to provide equal error-correction capability uniformly to all data bits. More specifically, in the quadratic data format an error at a given data point tends to correlate with another error at a different data point and there is a higher degree of correlation between nearby data points than the degree of correlation between remote data points. Thus, the coding technique must take this fact into account in an efficient manner. It has been the usual practice to provide error-correction encoding prior to differential coding and provide error-correction decoding after differential decoding. This prior art method, however, requires a high degree of error-correction capability to cope with the error's self-multiplying nature, thus resulting in inefficient, costly equipment.

SUMMARY OF THE INVENTION

It is therefore an object of the present invention to overcome the aforesaid prior art problems.

The stated objective is obtained by differentially encoding part of the data bits of first multilevel input data to form second data comprising the differentially encoded data bits and the remainder data bits and converting the bit patterns of the second data into third data in two-dimensional multilevel signal space according to a predetermined transfer function. A transparent error-correcting code is derived from each of the different phases of the third data and appended to each different phase to thereby form fourth data which is then modulated upon a carrier in two-dimensional multilevel signal space for transmission to a destination. At a receiving end, the received signal is demodulated to recover the fourth data. The appended error-correcting code is separated from each different phase of the fourth data. An error which might exist in the received data is corrected by the separated error-correcting code in respect of each phase. The bit pattern of the error-corrected data is reconverted to recover the original second data. Part of the data bits of the second data is differentially decoded to recover the original first data.

BRIEF DESCRIPTION OF THE DRAWINGS

The present invention will be described in further detail with reference to the accompanying drawings, in which:

FIG. 1 is a schematic block diagram of a transmitter embodying the invention;

FIG. 2 is a schematic block diagram of a receiver embodying the invnetion;

FIGS. 3 and 4 are illustrations of coding formats;

FIG. 6 is a block diagram illustrating the detail of the transparent error-correcting decoder of FIG. 2.

DETAILED DESCRIPTION

Figure 5:
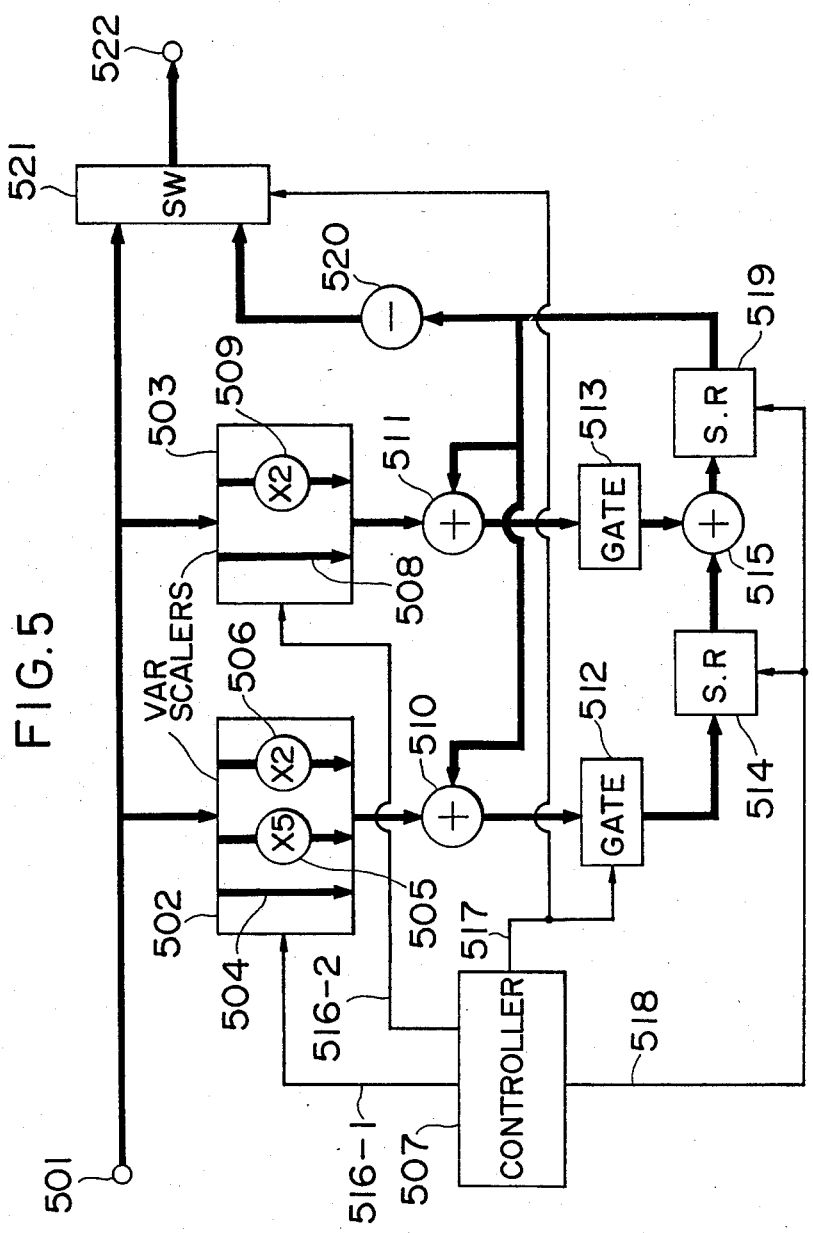
FIG. 5 is a block diagram illustrating the detail of the transparent error-correcting encoder of FIG. 1.

A transmitter embodying the present invention is schematically illustrated in FIG. 1. The transmitter is adapted to receive a $2^6$-ary Gray code signal and includes a differential encoder 103 coupled to a first input terminal 101, a bit-pattern converter 104 connected to the output of the differential encoder 103 and to a second input terminal 102 of the transmitter. The bit-pattern converter 104 and error-correcting encoders 105 and 106 constitute a converter that converts the 6-bit multilevel data into data in two-dimensional multilevel signal space. The differential encoder 103 comprises a Gray-to-Natural converter 401. This converter provides conversion of data from 00 to 00, 01 to 01, 11 to 10 and 10 to 11. A two-bit adder 402 has a first input coupled to the output of converter 401 and a two-bit shift register 403 is provided having its input coupled to the output of adder 402 and its output coupled to the second input of adder 402. Transparent error-correcting encoders 105 and 106 of identical structure are connected to output terminals of the bit-pattern converter 104, the outputs of the error-correcting encoders being coupled to a $2^6$-ary quadrature amplitude modulator 108. The input signal to the transmitter is represented by a six-bit Gray code two bits of which are used for indicating the quadrant in which the remaining four-bit information data is located. The remaining four bits represent the location of data in the indicated quadrant. The two-bit data is applied to the first input terminal 101 and thence to the differential encoder 103 where the two-bit input is differentially encoded to ensure against the carrier's phase ambiguities. The remaining four-bit data is applied to the second input terminal 102. The six-bit data are translated by the bit-pattern converter 104 according to a predetermined transfer function into a bit-pattern which fits well with the algorithm with which parity bits are synthesized and added to them by the error-correcting encoders 105 and 106. The translated 6-bit data are divided into segments of three bits each which are respectively applied to the transparent error-correcting encoders 105 and 106 and encoded into two-dimensional data x and y on an in-phase channel and a quadrature channel, respectively, and supplied to the modulator 108. The modulated six-bit data stream is delivered on a transmission line 109 to a receiver at the distant end of the line 109.

The receiver, shown schematically at FIG. 2, includes a $2^6$-ary quadrature amplitude demodulator 208 with which the input data stream is demodulated into two data streams x', y' of 3 bit each on the in-phase and quadrature channels. The 3-bit data streams x' and y' are applied to transparent error-correcting decoders 205 and 206 of identical structure. The error-corrected 3-bit data streams are applied to a bit-pattern converter 204 which provides transformation of the bit pattern in a manner inverse to that of the bit-pattern converter 204 to recover the original bit pattern. Two bits of the recovered 6-bit pattern are applied to a differential decoder 203 having a function inverse to that of the differential encoder 103. The differential decoder 203 comprises a two-bit register 404 having its input coupled to the associated output of bit-pattern converter 204, a subtractor 405 which provides modulo-4 subtraction of input data from the converter 204 and a data output from the shift register 404, and a Natural-to-Gray converter 406 coupled to the output of the subtractor 405. The function of the Natural-to-Gray converter 406 is inverse to that of the Gray-to-Natural converter 401 so that it provides conversion of data from 00 to 00, 01 to 01, 10 to 11 and 11 to 10. The decoded two-bit data is applied to a first output terminal and the remaining four-bit data is applied from the bit-pattern decoder 204 to a second output terminal 202.

The input data applied to the first input terminal of the transmitter, FIG. 1, has a Gray code pattern so that bit patterns 00, 01, 11 and 10 represent the first, second, third and fourth quadrants, respectively. If the transmitted data is erroneously received in a quadrant adjacent to the right one, the error would only amount to as much as one bit.

The data bits applied to the second terminal 102 have such a bit pattern that the Hamming distance between data points at which error is most likely to occur is made small as possible so that the transmitted data is not affected by phase ambiguities. A typical example of the data structure is shown in FIG. 3 in which the Hamming distance is taken to be "1" since those data points remote from the origin tend to form a cluster with adjacent data points. Upon the occurrence of a 90° phase error, the four-bit pattern is invariant to such phase error, whereas the bit pattern of the two-bit data can be represented by an addition of "1" to the base of four provided that "00"=0, "01"=1, "11"=2 and "10"=3. In other words, 0, 1, 2, 3 would become 1, 2, 3 and 0, respectively. Likewise, the two-bit pattern would be represented by an addition of "2" or "3" to the base of four in response to the occurrence of a phase shift of 180° or 270°, respectively. When this occurs at the input of the differential decoder 203, all the input data will be applied thereto as an addition of "1", "2" or "3" to the base of four. However, the ambiguous components "1", "2" and "3" are removed by the subtractor 405.

The data input to each of the error-correcting encoders 105 and 106 is in the form of a three-bit word (0=000, 1=001, 2=010, 3=011, 4=100, 5=101, 6=110, 7=111) to which is added a three-bit parity word according to modulo-8 summation during encoding operations, so that it is permissible that the data words 0 to 7 may be arranged in a recyclic pattern on the in-phase and quadrature axes as shown in FIG. 4.

The bit pattern converter 103 provides bit pattern conversion of a data set shown at FIG. 3 (in which the quadrant indicating 2-bit data are omitted for simplicity) to a data set shown at FIG. 4. For example, an input data set (2,14)=(11,1001) in the FIG. 3 code scheme is converted to a corresponding output data set (6,7)=(110,111) in the FIG. 4 code scheme.

Consider now the code format of the transparent error-correcting code. The transparent error-correcting code is an eight-level codeword. The characteristic of the transparent code for differential phase-shift keying is fully described in an article titled "A Class of Error Correcting Codes for DPSK Channels", Katshuhiro Nakamura, International Conference on Communications, Boston, MA, June 10–14, 1979. As will be described later, if the same transparent code is used in each of the in-phase and quadrature channels, the first type of prior art problem can be successfully eliminated. In other words, an error that occurred in a transmission medium is fed to the error-correcting decoders 205 and 206 without bit-error multiplication. Thus, ambiguous phase shifts would in no way affect the operation of the error-correcting decoders, so that the input data pass therethrough transparently to the differential decoder 203. The article just mentioned above also describes a method for deriving single Lee-error correcting codes which are advantageous to correction of +1 and −1 bit errors. A transparent error-correcting code having a single-Lee error correcting capability can be represented in a code scheme shown at FIG. 4 and used independently in the in-phase and quadrature channels of the transmitter and receiver described in FIGS. 1 and 2 so that they are capable of correcting a one-bit error which is erred by +1 or −1 on the side of the in-phase channel or on the side of the quadrature channel. In other words, the error of the type which occurs within a given code word and which errs on adjacent data points that surround its own data point, can be corrected. Furthermore, the coding efficiency is highly as described above. For example, a high efficient code having a wordlength of 30 with 28 information symbols has a single Lee-error correcting capability as described in the Nakamura article. Therefore, the use of such transparent error-correcting codes not only eliminates the first type of the prior art problem, it also solves the second type of the problem.

The description will now be concerned with a method of constructing the error-correcting encoders 105, 106 and the error-correcting decoders 205 and 206 that deal with a single Lee-error correcting code C having a 30-wordlength and 28 information symbols which is represented by (30, 28) for convenience. Each codeword of the correcting-code comprises a sequence of information symbols $a_1, a_2, \ldots, a_{28}$ and redundancy symbols $a_{29}$ and $a_{30}$. The codeword $A=(a_1, a_2, \ldots, a_{29}, a_{30})$ is given as A. $H = 0 \pmod{8}$ (1)

where H is given by the following Equation:

$$H = \begin{bmatrix} 26 \\ 64 \\ 42 \\ 22 \\ 20 \\ 02 \\ 13 \\ 36 \\ 65 \\ 51 \\ 14 \\ 45 \\ 57 \\ 76 \\ 61 \\ 15 \\ 54 \\ 41 \\ 17 \\ 72 \\ 25 \\ 55 \\ 50 \\ 05 \\ 53 \\ 32 \\ 21 \\ 11 \\ 10 \\ 01 \end{bmatrix} \quad (2)$$

Each of the elements $a_i$ in Equation 1 comprises a three-bit word representing an integer from 0 to 7, and operation is based on modulus 8 ($=2^3$). More specifically, addition, subtraction and multiplication involves calculation of the 3-bit representing integers and the result of the calculation is given by the lower three bits. Furthermore, in Equation 2, the "i"th term of H is given by a coefficient digit pattern ($h_{i1}$, $h_{i2}$) of the remainder polynomial ($h_{i1}X + h_{i2}$) which is derived when the following terms are divided by the generating polynomial ($X^2 - X - 1$) of this code:

(1) $2 \cdot X^{30-i}$, when i=1 to 6,
(2) $(4X+1) \cdot X^{30-i}$, when i=7 to 18
(3) $1 \cdot X^{30-i}$, when i=19 to 30 where, 2, (4x+1) and 1 in these terms are called transformation polynomials.

Since Equation 1 can be rearranged into Equation 3 as given below, $$(a_1h_{1,1}, a_1h_{1,2}) + (a_2h_{2,1}, a_2h_{2,2}) + \ldots + (a_{30}h_{30,1} + a_{30}h_{30,2}) = 0 \pmod 8 \quad (3)$$

the error-correcting code (30,28) includes (00, ... 0), (1,1, ... ,1), (2,2, ... ,2), (3,3, ... ,3), (4,4, ... ,4), (5,5, ... ,5), (6,6, ... ,6), (7,7, ... ,7) as part of its codewords and satisfies linearity in modulo 8 operation.

Equation 3 is further written as, $$\sum_{i=1}^{30} a_i \cdot (h_{i1}X + h_{i2}) = 0$$

Let A(X) be denoted by Equation 4.

$$A(X) = \sum_{i=1}^{6} a_i \cdot 2X^{30-i} + \sum_{i=7}^{18} a_i \cdot (4X+1)X^{30-i} + \sum_{i=19}^{30} a_i \cdot X^{30-i} \pmod 8 \quad (4)$$

The redundancy symbols $a_{29}$ and $a_{30}$ can be determined by dividing A(X) by the generator polynomial ($X^2 - X - 1$) and nullifying the remainder polynomial of the division. More specifically, the generator polynomial ($X^2 - X - 1$) is used to divide the following equation, $$(2 \cdot a_1)X^{29} + (2 \cdot a_2)X^{28} + \ldots + (2 \cdot a_6)X^{24} + \{a_7(4X+1)\}X^{23} + \{a_8(4X+1)\}X^{22} + \ldots + \{a_{18}(4X+1)\}X^{12} + a_{19}X^{11} + a_{20}X^{10} + \ldots + a_{28}X^2$$

and cX+d is taken as the remainder polynomial, then the symbols $a_{29}$ and $a_{30}$ are obtained as follows:
$a_{29} = -c \pmod 8$
$a_{30} = -d$ FIG. 5 is an illustration of the detail of the error-correcting encoders 105 and 106 that generates the (30, 28) error-correcting code. Illustrated at 501 is an input terminal to which information symbols $a_1, a_2, \ldots, a_{28}$ are applied. The input information is fed to a variable scaling circuits 502 and 503. The circuit 502 includes a direct path 504, a ×5 multiplier 505 and a ×2 multiplier 506 one of which is selectively placed in circuit in response to a control signal supplied on line 516-1 from a controller 508. The control signal on line 516-1 controls the scaling circuit so that for an input $a_i$ (where i=1 to 6), the ×2 multiplier 506 is selected to deliver a $2a_i$ output, for an input where i=7 to 18, the ×5 multiplier 505 is selected to provide a $5a_i$ and for i=19 to 28, the direct path 504 is selected to pass the input $a_i$ direct to the output. The variable scaling circuit 503 includes a direct path 508 and a ×2 multiplier 509, one of which is selected by a control signal on line 516-2 from the controller 507 so that for an input i=1 to 6 the ×2 multiplier 509 is selected and for an input i=7 to 28, the direct path 508 is selected. The outputs of the variable scaling circuit 502 and 503 are respectively fed to 3-bit adders 510 and 511, the outputs of the adders 510 and 511 being coupled through gates 512 and 513 to a 3-bit shift register 514 and a 3-bit adder 515, respectively.

The gates 512 and 513 are responsive to a gating control signal on line 517 from the controller 507 to open their gate paths during the time information symbols $a_1$ to $a_{28}$ are present and to close the gate paths for a period of two clock pulses to inhibit the redundancy symbols $a_{29}$ and $a_{30}$. The 3-bit shift register 514 stores the information symbols for one clock period in response to a timing signal on line 518 from the controller 507 so that the output of the shift register 514 is delayed by one clock period and fed to the adder 515 to be combined with the signal from the adder 511. The output of the adder 515 is applied to a 3-bit shift register 519 to provide a one-clock interval delay, the output of the shift register 516 being applied to the adders 510 and 511 and also to a negative multiplier 520 and thence to a switching circuit 521 to which the input signal is also applied. The switching circuit 521 is responsive to the signal on line 517 so that it establishes a path for information symbols $a_1$ to $a_{28}$ to an output terminal 522 and then switches to establish a path from the multiplier 520 to deliver its output as redundant symbols $a_{29}$ and $a_{30}$ from the multiplier 520.

The description will now be concerned with a procedure with which the thus encoded information symbols are decoded by the error-correcting decoders 205 and 206. As is seen from Equation 2, if the "i"th term of H is taken as ($h_{i1}$, $h_{i2}$), 4×30 (=120) vectors are derived which are distinct from each other.

$$\{(\pm h_{i1}, \pm h_{i2}), (\pm h_{i1}, \mp h_{i2}) \pmod 8), i=1 \text{ to } 30\} \quad (4)$$

Let $a' = (a_1', a_2', \ldots a_{30}')$ denote the received codewords. Assume that an error of $\pm 1 \pmod 8$ has occurred on the "i"th symbol of the received codewords. A syndrome $a' \cdot H$ is given by $$a' \cdot H = \{(a1, a2, \ldots, an) + (0, 0, \ldots, 0, \pm 1, 0, \ldots, 0)\} \cdot H \quad (5)$$
$$= \pm (h_{i1}, h_{i2}) \pmod 8$$

Since the vectors of Equation 4 are all distinct from each other, an error of $\pm 1 \pmod 8$ can be detected in the assumed "i"th digit position from the syndrome $a' \cdot H$. As long as there is a single $\pm 1$ error in a codeword, the (30,28) error-correcting code is capable of correcting such errors. The syndrome $a' \cdot H$ can be derived by dividing $A'(X)$ by $X^2 - X - 1$, where $A'(X)$ is given as follows:

$$\begin{aligned}A'(X) = &(2a_1')X^{29} + (2a_2')X^{28} + \ldots + (2a_6')X_{24} + \\&\{a_7'(4X+1)\}X^{23} + \{a_8'(4X+1)\}X^{22} + \ldots + \\&\{a_{18}'(4X+1)\}X^{12} + a_{19}' X^{11} + \\&A_{20}' X^{10} + \ldots + a_{29}'X + a_{30}'\end{aligned} \quad (6)$$

The syndrome equals the coefficient digit pattern of the remainder polynomial which is derived from the division.

FIG. 6 is an illustration of the detail of the error-correcting decoders. Variable scaling circuits 602 and 605 are coupled to an input terminal 601 to which received information symbols $a_1'$ to $a_{30}'$ are supplied from the demodulator 208. The scaling circuit 602 includes a direct path 603 and a ×2 multiplier 604 and responds to a control signal on line 621 from a controller 624 by passing the received information symbols $a_i'$ through the multiplier 604 when i=1 to 6 and passing the symbols through the direct path 603 when i=7 to 30. The scaling circuit 605 includes a grounded path 605a and a ×4 multiplier 606 and responds to a signal on line 619 from the controller 624 by providing a grounded output when i=1 to 6, 19 to 30 and passing the input symbols through the multiplier 606 when i =7 to 18. The outputs of the scaling circuits 602 and 605 are fed to adders 606 and 608, respectively. The output of adder 607 is stored in a 3-bit shift register 609 for a single clock interval, the output of shift register 609 being coupled to an adder 610 to be combined with the output of adder 608 on the one hand, and on the other to a buffer memory 612. The combined output from adder 610 is applied to a second shift register 611 for another clock delay. The output of the shift register 611 is applied on the one hand to the adders 607 and 608, and on the other to the buffer memory 612. The shift registers 609 and 611 are cleared in response to a pulse on line 620 and driven to shift their stored bits in response to a clock pulse on line 622 from the controller 624.

Upon reception of the input symbols, syndromes are generated in the shift registers 609 and 611. The generated syndromes are transferred in response to a set pulse on line 623 to the buffer memory 612. A clear pulse on line 620 causes the shift registers 609 and 611 to be cleared.

Illustrated at 613 is a read-only memory which stores error value data and error location data in storage locations addressable as a function of the syndromes stored in the buffer memory 612. The addressed error data are delivered on line 626 to indicate whether the error is +1 or −1 to a correction circuit 616 to which the information symbols from the input terminal 601 is applied through buffer 618, and the addressed error location data are fed to a comparator 614 for comparison with a binary output from a counter 615 which is synchronized with the received input data and initialized in response to the set pulse on line 623. On the occurrence of a coincidence between the data from memory 613 and counter 615, the comparator 614 issues an enabling pulse on line 625 to the correction circuit 616 to effect the correction of the input data.

While the circuits shown in FIGS. 5 and 6 are designed for information symbols (30, 28), it is obvious to alter the circuits to create a single Lee-error code having different parameters. For example, a single Lee-error code in which the parameters include information symbols (84, 81), a generator polynomial $X^{3-X}-1$ and a transformation polynomial (5, $1+4X+4X^2$, 1) can be derived by dividing the codewords ($a_1$ to $a_{84}$) into a set of three subblocks ($a_l$ to $a_{29}$), ($a_{29}$ to $a_{56}$) and ($a_{55}$ to $a_{84}$) and processing each subblock as an independent data block. Furthermore, a multilevel Lee-error correcting code coupled be implemented by multiplexing the error location data on line 626.

If the data points of the outputs x, y of the transparent error-correcting encoders 105 and 106 have undergone phase reversals of 90°, 180° and 270°, their data points can be given by (7−y,x), (7−x,7−y),(y,7−x) as seen from FIG. 4 (where 7−x, 7−y are obtained by modulo 8 operation). Let ($x_l, x_2, \ldots, x_N$), ($y_1, y_2, \ldots, y_N$) denote the codewords having a wordlength N which are derived from the encoders 105 and 106. The input codewords to the error-correcting decoders 205 and 206 are given as follows:

$$(x'_1, x'_2, \ldots, x'_N), (y'_1, y'_2, \ldots, y'_N) \quad (7)$$

or $$(7-y'_1, 7-y'_2, \ldots 7-y'_N), (x'_1, x'_2, \ldots, x'_N) \quad (8)$$

or $$(7-x'_1, 7-x'_2, \ldots 7-x,N), (7-y'_1, 7-y'_2, \ldots, 7-y'_N) \quad (9)$$

or $$(y'_1, y'_2, \ldots, y'_N), (7-x'_1, 7-x'_2, \ldots, 7-x'_N) \quad (10)$$

where, x' and y' equal x and y, respectively, when no error is introduced during transmission.

Since (7,7,...,7) is a correct codeword which validly establishes linearity, the following codewords are also valid:
$(7-x'_1, 7-x'_2, \ldots, 7-x'_N) = (7,7, \ldots 7) - (x'_1, x'_2, \ldots, x'_N)$ and $(7-y'_1, 7-y'_2, \ldots 7-y'_N) = (7,7, \ldots 7) - (y'_1, y'_2, \ldots y'_N)$.

Therefore, the codewords given by Equations 6 to 10 with the primes (') being removed are derived from the transparent error-correcting decoders 205 and 206. An error introduced during transmission would no longer multiply itself prior to application to the decoders 205 and 206. Phase errors of 90°, 180° and 270° would only affect the input two-bit codeword applied to the differential decoder 203 such that it would contain a constant value which can be removed by modulo 4 subtraction by the differential decoder 203.

As described in the foregoing, the present invention no longer permits a transmisssion error to multiply itself prior to error decoding and provides a highly efficient coding which allows only those errors close to the data point of interest to be corrected. Therefore, the invention can be implemented at a low cost with simplified circuitry.

The foregoing description shows only a preferred embodiment of the present invention. Various modifications are apparent to those skilled in the art without departing from the scope of the present invention which is only limited by the appended claims. For example, the error-correcting encoders 105 and 106 could be combined into a single encoder which is used on a time-shared basis. The same applies to the error-correcting decoders. The description has been concerned with a $2^6$-ary data format. However, the system could be easily modified to meet any other data format.

What is claimed is:

1. A method for correcting errors comprising, differentially encoding part of the data bits of first multilevel input data to form second data comprising the differentially encoded data bits and the remainder data bits, converting the bit patterns of the second data into third data in two-dimensional multilevel signal space according to a predetermined transfer function, deriving a transparent error-correcting code from each of the different phases of the third data and appending the error-correcting code to each different phase to thereby form fourth data, modulating said fourth data in two-dimensional multilevel signal space for transmission to a destination, demodulating the modulated fourth data, separating the appended error-correcting code from each different phase of the demodulated fourth data, correcting an error which might exist in the different phase of the fourth data with the separated error-correcting code, reconverting the bit pattern of the error-corrected data to recover the original second data and differentially decoding part of the data bits of the second data to recover the original first data.

2. A method for encoding data for error correction comprising, differentially encoding part of the data bits of first multilevel input data to form second data comprising the differentially encoded data bits and the remainder data bits, converting the bit patterns of the second data into third data in two-dimensional multilevel signal space according to a predetermined transfer function, and deriving a transparent error-correcting code from each of the different phases of the third data and appending the error-correcting code to each different phase.

3. A method for decoding multilevel data formatted into two-dimensional multilevel signal space, wherein part of the bits of said data has been differentially encoded and the differentially encoded data bits and the other data bits are each appended with a transparent error-correcting code, said method comprising separating the appended error-correcting code from each different phase of said data, correcting an error which might exist in the different phase of said data with the separated error-correcting code, converting the bit pattern of the error-corrected data according to a predetermined transfer function and differentially decoding part of the data bits of the converted data.

4. A method for correcting errors comprising:
 (a) dividing a multilevel input data stream into a first pair of multilevel data streams;
 (b) differentially encoding one of the data streams of said first pair to form a second pair of multilevel data streams by the differentially encoded data stream and the remainder of the first pair;
 (c) converting the bit patterns of the data streams of said second pair into a third pair of multilevel data streams in two-dimensional multilevel signal space according to a predetermined transfer function;
 (d) deriving a transparent error-correcting code from each of the data streams of said third pair and appending the derived code to each data stream of said third pair;
 (e) modulating the data streams of said third pair and the appended error-correcting code in two-dimensional multilevel signal space and deriving therefrom a modulated single data stream for transmission to a destination;
 (f) receiving and demodulating the modulated data stream to recover the data streams of said third pair in two-dimensional multilevel signal space and the appended error-correcting code;
 (g) correcting an error which might exist in the recovered data streams with the appended error-correcting code;
 (h) reconverting the bit patterns of said error-corrected data streams to the data streams of said second pair; and
 (i) differentially decoding one of the data streams of said second pair to recover the data streams of said first pair.

5. A method for encoding data comprising:
 (a) dividing a multilevel input data stream into a first pair of multilevel data streams;
 (b) differentially encoding one of the data streams of said first pair to form a second pair of multilevel data streams by the differentially encoded data stream and the remainder of the first pair;
 (c) converting the bit patterns of the data streams of said second pair into a third pair of multilevel data streams in two-dimensional multilevel signal space according to a predetermined transfer function; and
 (d) deriving a transparent error-correcting code from each of the data streams of said third pair and appending the derived code to each data stream of said third pair.

6. A method for decoding a pair of multilevel data streams in two-dimensional multilevel signal space, wherein one of said data streams has been differentially encoded and the differentially encoded data stream and the other data stream are each appended with a transparent error-correcting code, said method comprising:
 (a) separating said appended error-correcting code from said data streams;
 (b) correcting an error in said data streams with the separated error-correcting code;
 (c) converting the bit patterns of said error-corrected data streams according to a predetermined transfer function; and
 (d) differentially decoding one of the converted data streams to recover the original data streams.

7. A coding and decoding apparatus comprising:
 a pair of first and second terminals, said first terminal being receptive of one of two multilevel data streams of a first pair, said second terminal being receptive of the other data stream;

means coupled to said first terminal for differentially encoding the data stream received thereat to thereby form a second pair of multilevel data streams by the differentially encoded data stream and the other data stream;

means for converting the bit patterns of the data streams of said second pair into a third pair of multilevel data streams in two-dimensional multilevel signal space according to a predetermined transfer function;

means for deriving a transparent error-correcting code from each of the data streams of said third pair and appending the derived code to each data stream of said third pair;

means for modulating the data streams of said third pair and the appended error-correcting code in two-dimensional multilevel signal space and deriving therefrom a modulated single data stream for transmission;

means for demodulating the modulated data stream to recover the data streams of said third pair in two-dimensional multilevel signal space and the appended error-correcting code;

means for correcting an error which might exist in the recovered data streams with the appended error-correcting code;

means for reconverting the bit patterns of said error-corrected data streams to the data streams of said second pair; and means for differentially decoding one of the data streams of said second pair to recover the data streams of said first pair.

8. An error coding apparatus comprising:

a pair of first and second terminals, said first terminal being receptive of one of two multilevel data streams of a first pair, said second terminal being receptive of the other data stream;

means coupled to said first terminal for differentially encoding the data stream received thereat to thereby form a second pair of multilevel data streams by the differentially encoded data stream and the other data stream;

means for converting the bit patterns of the data streams of said second pair into a third pair of multilevel data streams in two-dimensional multilevel signal space according to a predetermined transfer function; and means for deriving a transparent error-correcting code from each of the data streams of said third pair and appending the derived code to each data stream of said third pair.

9. An error decoding apparatus for decoding a pair of multilevel data streams in two-dimensional multilevel signal space, wherein one of said data streams has been differentially encoded and the differentially encoded data stream and the other data stream are each appended with a transparent error-correcting code, comprising:

first and second means for separating the appended transparent error-correcting code from each of said data streams and correcting an error which might exist in each of said data streams with the separated error-correcting code;

means for converting the bit patterns of said error-corrected data streams according to a predetermined transfer function; and means for differentially decoding one of the error-corrected data streams.

* * * * *

UNITED STATES PATENT AND TRADEMARK OFFICE
CERTIFICATE OF CORRECTION

PATENT NO. : 4,553,237

DATED : November 12, 1985

INVENTOR(S) : Katsuhiro NAKAMURA

It is certified that error appears in the above-identified patent and that said Letters Patent is hereby corrected as shown below:

Column 5, Line 36, "$(h_{i1}, hi_2)$" should read --$(h_{i1}, h_{i2})$;

Signed and Sealed this

Fifth Day of August 1986

[SEAL]

Attest:

DONALD J. QUIGG

Attesting Officer

Commissioner of Patents and Trademarks